US008453182B2

(12) United States Patent
Lee et al.

(10) Patent No.: US 8,453,182 B2
(45) Date of Patent: May 28, 2013

(54) METHOD AND MOBILE TERMINAL FOR OUTPUTTING BROADCAST DATA AND SUPPLEMENTARY INFORMATION DATA

(75) Inventors: Won-Jong Lee, Gyeonggi-Do (KR); Tae-Jung Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 673 days.

(21) Appl. No.: 12/117,106

(22) Filed: May 8, 2008

(65) Prior Publication Data

US 2009/0064236 A1 Mar. 5, 2009

(30) Foreign Application Priority Data

Aug. 31, 2007 (KR) ........................ 10-2007-0088577

(51) Int. Cl.
*G06F 13/00* (2006.01)
*H04N 7/16* (2006.01)

(52) U.S. Cl.
USPC .................. 725/61; 725/51; 725/60; 725/40; 725/46; 725/44; 725/50; 725/52; 725/56; 455/403

(58) Field of Classification Search
USPC ...................................... 725/37–61; 455/403
See application file for complete search history.

(56) References Cited

U.S. PATENT DOCUMENTS

| | | | | |
|---|---|---|---|---|
| 5,848,352 | A * | 12/1998 | Dougherty et al. | 725/110 |
| 6,571,392 | B1 | 5/2003 | Zigmond et al. | |
| 6,774,926 | B1 * | 8/2004 | Ellis et al. | 348/14.01 |
| 6,871,323 | B2 * | 3/2005 | Wagner et al. | 715/716 |
| 7,765,568 | B1 * | 7/2010 | Gagnon et al. | 725/38 |
| 2001/0001160 | A1 * | 5/2001 | Shoff et al. | 725/51 |
| 2002/0184646 | A1 * | 12/2002 | Lord | 725/109 |
| 2005/0039136 | A1 * | 2/2005 | Othmer | 715/774 |
| 2005/0055716 | A1 * | 3/2005 | Louie et al. | 725/58 |
| 2006/0184982 | A1 * | 8/2006 | Paz et al. | 725/88 |
| 2007/0174871 | A1 * | 7/2007 | Kim et al. | 725/41 |
| 2008/0040758 | A1 * | 2/2008 | Beetcher et al. | 725/81 |
| 2010/0325667 | A1 * | 12/2010 | Lee et al. | 725/51 |

FOREIGN PATENT DOCUMENTS

| | | |
|---|---|---|
| EP | 1761059 | 3/2007 |
| GB | 2370456 | 6/2002 |

* cited by examiner

*Primary Examiner* — Jun Fei Zhong
(74) *Attorney, Agent, or Firm* — Lee, Hong, Degerman, Kang & Waimey

(57) ABSTRACT

A mobile terminal includes a receiving unit for receiving broadcast data and supplementary information data associated with the broadcast data, a controller for retrieving and synchronizing the supplementary information data with the broadcast data for output, and an output unit for outputting the synchronized supplementary information data and the broadcast data in real time.

11 Claims, 8 Drawing Sheets

METHOD AND MOBILE TERMINAL FOR OUTPUTTING BROADCAST DATA AND SUPPLEMENTARY INFORMATION DATA

CROSS-REFERENCE TO RELATED APPLICATION

Pursuant to 35 U.S.C. §119(a), this application claims the benefit of earlier filing date and right of priority to Korean Application No. 10-2007-0088577 filed on Aug. 31, 2007, the contents of which are hereby incorporated by reference herein in their entirety.

FIELD OF THE INVENTION

A method for outputting previously downloaded supplementary information data upon real-time synchronization with broadcast or program data being output, and a mobile terminal for implementing the same are provided.

DESCRIPTION OF THE RELATED ART

Currently, there is no technique available for allowing previously downloaded data, such as images and subtitles, to be output in synchronization with broadcast data currently being output. Thus, to synchronously output supplementary data with the broadcast data currently being output, the supplementary data first needs to be received.

However, if large capacity supplementary information data needs to be received during real time broadcasting, simultaneously outputting such large capacity supplementary information data and a broadcast screen image would be impossible because downloading such large capacity supplementary information data would take too much time.

Therefore, in the related art mobile terminal, providing the supplementary information having large capacity data in synchronization with the corresponding broadcast data while performing a broadcast service would be difficult.

SUMMARY OF THE INVENTION

An aspect of the present invention is to provide a mobile terminal which includes a receiving unit for receiving broadcast data and supplementary information data associated with the broadcast data, a controller for retrieving and synchronizing the supplementary information data with the broadcast data for output, and an output unit for outputting the synchronized supplementary information data and the broadcast data in real time. The mobile terminal may further include a communication unit for accessing a network entity from which the supplementary information data is downloaded and a memory for storing the downloaded supplementary information data.

Preferably, the output unit selectively outputs a list of available supplementary information data associated with the broadcast data under control of the controller and the controller synchronizes the supplementary information data with the broadcast data by using index information.

The index information may include at least one of channel information, program information, synchronization time information, a name associated with the supplementary information, a capacity associated with the supplementary information, a format associated with the supplementary information data, and URL (Uniform Resource Locator) information from which the supplementary information data is downloaded.

Preferably, the receiving unit receives the supplementary information data prior to the output unit outputting the broadcast data and the supplementary information data is received prior to the broadcast data.

Another aspect of the invention is to provide a method for outputting broadcast data and supplementary information data in synchronization. The method includes downloading and storing supplementary information data that is associated with broadcast data, retrieving the stored supplementary information data associated with the broadcast data, synchronizing the retrieved supplemental information data with the broadcast data, and outputting the synchronized supplementary information data and broadcast data.

The supplementary information data may include data associated with a channel or a program selected in a broadcast mode. Synchronizing the supplementary information data with the broadcast data may include using index information.

The method for outputting broadcast data and supplementary information data in synchronization may further include displaying a list of the supplementary information data for a user to selectively download the supplementary information data associated with the selected channel or program.

The supplementary information data may be downloaded before or while the broadcast data is received. The supplementary information data may be downloaded when one of a communication fee is paid, during a period when call or data communication is minimal, and at a specific time set by a user.

The supplementary information data may include index information required for the synchronization, the index information comprising at least one of channel information, program information, synchronization time information, a name associated with the supplementary information data, a capacity associated with the supplementary information data, a format associated with the supplementary information data, and URL (Uniform Resource Locator) information from which the supplementary information data is downloaded. The supplementary information data may also include multimedia data, the multimedia data comprising at least one of music, video, photos and pictures, and documents which include text information.

The displayed list may include a selectable icon for the user to select supplementary information data and information related to at least one of a channel, a program, a name, a capacity, an estimated download time, payment information, and downloading status associated with the supplementary information data. The list may be displayed such that the displayed list overlaps with different channel information.

The method for outputting broadcast data and supplementary information data in synchronization may further include dividing a display screen into at least two display regions, wherein a first display region displays channel information, program information or a broadcast screen image, and a second display region displays a supplementary information list associated with the selected channel or program.

The method may further include shifting information related to the selected channel or a different channel on a display screen in order to display the list at a region of the display screen between the selected channel and the different channel.

The method may further include displaying a download progress status or download completion information at one portion of a broadcast screen image being output when downloading of the supplementary information data is finished. The download progress status or download completion information may be displayed as at least one of text, a symbol, a video, an image, an animation and a graphic.

The method may further include displaying an indicator that has a different color or a different display effect than the download progress status or download completion information in order to indicate a status of the downloading.

Yet another aspect of the invention is to provide a user interface of a multimedia playback device. The user interface includes a first screen region for displaying real-time broadcast data and a second screen region for displaying supplementary data related to the real-time broadcast data, wherein the supplementary data has been downloaded prior to broadcasting the real-time broadcast data and the supplementary data is displayed concurrently with the real-time broadcast data in order to allow user interaction with the supplementary data via graphical icons displayed on the second screen region.

Preferably, the graphical icons include a status icon and one or more selectable icons. Preferably, the selectable icons are activated in response to user inputs on a touch screen or manipulation of other input means. Preferably, the second screen region includes any screen region other than the first screen region.

BRIEF DESCRIPTION OF THE DRAWINGS

The above and other features and advantages of the present invention will become more apparent by describing in detail preferred embodiments thereof with reference to the attached drawings.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
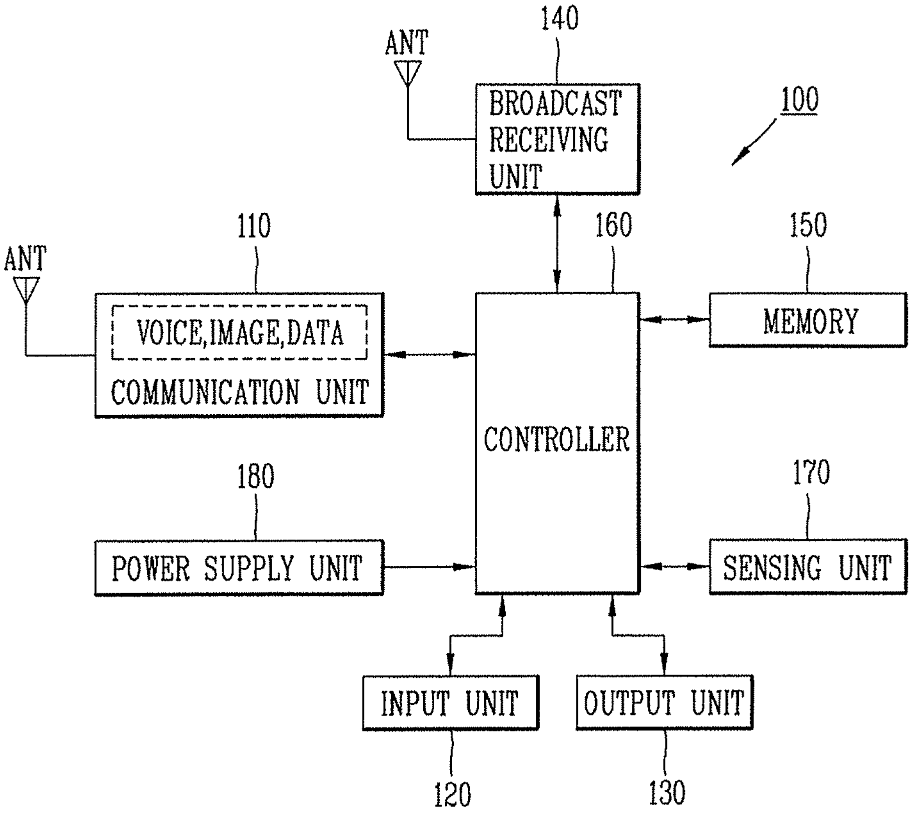
FIG. 1 is a schematic block diagram of a configuration of a mobile terminal according to the present invention.

With reference to FIG. 1, a mobile terminal 100 according to the present invention includes a communication unit 110 that transmits and receives supplementary information data associated with audio, video and broadcast programs to and from an external terminal or a network server via a wired or wireless manner, a broadcast receiving unit 140 that receives radio signals, TV signals and data broadcasts, an output unit 130 that receives audio, data, supplementary information, and URL (Uniform Resource Locator) information via the communication unit 110 or the broadcast receiving unit 140 and outputs at least one of them, an input unit 120 that receives a user input required for controlling the mobile terminal 100, a memory 150 that stores the broadcast information, the URL information, various programs required for controlling the terminal, and various data input to or output from the terminal, and a controller 160 that controls each element to process the received command, audio, video and data.

The mobile terminal 100 may further include a sensing unit 170 having multiple sensors to detect an operation state. The sensing unit 170 may include an optical sensor, a vibration sensor, a location sensor, or an acceleration sensor that may detect an opening motion, movement, rotation, a location and other characteristics related to the mobile terminal 100.

The mobile terminal 100 may further include a power supply unit 180 that supplies power provided via a battery or a power supply cable to the terminal. The power supply unit 180 may detect external power applied via a TA (Travel Adapter) or a USB (Universal Serial Bus) port, charge the battery using the external power, or provide power to the mobile terminal 100.

The communication unit 110 can connect with an external terminal or a server or computer via a wired or wireless manner under the control of the controller 160 and perform audio, video or data communication. URLs that indicate locations of the server(s) or other access information may be used for the link between the mobile terminal 100 and the server.

Supplementary information, such as an electronic service guide (ESG) or an electronic program guide (EPG), may be downloaded via the communication unit 110, and data constituting the supplementary information, such as video, music, audio, still images, and text, may be downloaded via the broadcast receiving unit 140.

The supplementary information data may be received through a communication link used for transmitting a broadcast signal or a path used for transmitting data. The supplementary information data may also be referred to as 'supplementary information' or 'data' in the present application.

The supplementary information may include at least one of a list of supplementary information data to be output in synchronization with a broadcast program when the broadcast program is output through a particular channel, URL information from which each supplementary information data may be downloaded, and synchronization time information at which the program and each supplementary information data are to be synchronized. The examples of supplementary information are not meant to be limiting.

The URL information may indicate the locations of files for each server that provides a supplementary information data download service and may include the type of the server, a location of the server, and a location of each file. The URL information may be provided in a form of supplementary information data provided by interworking with or in association with a real time broadcast, such as data actually constituting a broadcast supplementary information and subtitles.

The URL information may be automatically received and updated periodically at certain time periods from a particular server, or may be requested from a particular server as necessary. The supplementary information data provided together with the broadcast may be program associated data (PAD) or binary format for scenes (BIFS) data.

The input unit 120 may include a microphone that receives an audio signal, a keypad or a touch pad that receives key or touch inputs from the user, generates signals in response to the inputs, and outputs the signals to the controller 160. Downloaded supplementary information data may be selected via the input unit 120.

The output unit 130 may include a display means that displays information used for operating the mobile terminal 100 and performing various functions. The output unit 130 may also include a speaker or audio output means that outputs audio signals of another party during call communication and other sounds generated when the terminal performs the functions. The display means may include at least one of a Liquid Crystal Display (LCD) and an Organic Light Emitting Diode (OLED), or may be configured as a touch screen that combines an input function and a display function.

The output unit 130 may display a list or a menu of supplementary information data for display in synchronization with a broadcast program when the broadcast program is output. The display of the list or supplementary information is performed according to the supplementary information received via the broadcast receiving unit 140 or the communication unit 110. The list of supplementary information data may be displayed in various formats which will be described with reference to the accompanying drawings.

The broadcast receiving unit 140 may receive broadcast signals transmitted in a satellite or terrestrial signal reception mode. The broadcast signals may include various channels for transmitting radio reception, TV reception, or data broadcast reception, and additional channels that may receive supplementary information data related to the broadcast, such as the ESG and the EPG.

The memory 150 may store at least one of URL information from the ESG or the EPG including the supplementary information, or supplementary information data for output in synchronization with a program of one or more broadcast channels. The memory 150 may include an internal or external memory, such as a flash memory, a hard disk, a ROM, or a RAM. However, the memory 150 is not limited to a particular type of memory.

The supplementary information data that may be downloaded may include various types of data or information that are associated with the programs to be broadcast. The supplementary information data may be related to at least one of an advertisement, a banner, a quiz, a ballot, subtitles, stocks or financial data, sports scores, news items, weather forecasts, music, fashion, travel, or traffic videos.

The controller 160 checks whether there is any supplementary information data to be displayed in synchronization with the selected channel or program with reference to supplementary program when the user selects a particular channel from a channel list or selects a particular program from a schedule list. The controller 160 automatically connects with a network, for example via URL, from which the supplementary information data can be downloaded if there is supplementary information data for display in synchronization and downloads the supplementary information data.

Alternatively, a guidance or inquiry message for the user may be output and the supplementary information data may be automatically downloaded according to the user's response. Furthermore, a list of supplementary information data for selecting desired supplementary information data for download is output and only the supplementary information data selected by the user may be downloaded.

The controller 160 may automatically access a URL from which the selected supplementary information data can be downloaded when the user selects particular supplementary information data from the supplementary information data list. The supplementary information data may be downloaded through a communication link or path for at least one of transmitting supplementary information data, transmitting a broadcast signal, mobile communication, and transmitting supplementary information. The controller 160 downloads the selected supplementary information data from the URL and then stores the downloaded supplementary information data in the memory 150. The supplementary information data may be compressed or several types of supplementary information data may be grouped for transmission.

The controller 160 may store index information related to the supplementary information data stored in the memory 150. The index information may include a type of supplementary information data, program information of a channel desired for synchronization with the supplementary information data, and synchronization time information. The corresponding supplementary information data is retrieved from the memory 150 when a program designated by the index information is broadcast. The supplementary information data is then output as video reproduction, music reproduction, photo album reproduction, Internet access, or document opening according to the type of the supplementary information data, such as multimedia data or document data.

The controller 160 may be automatically connected with a URL from which a corresponding service or supplementary information data can be purchased if downloading of the supplementary information data is a paid service type or a portion of the supplementary information data to be downloaded is a paid data type in order to subscribe as a paid member or purchase individual supplementary information data. The applicable fee may be added to the user's phone charge when the paid data is downloaded. Alternatively, user authorization for payment may be requested prior to the downloading.

The controller 160 displays the paid data and free data distinctively when the supplementary information data list is output. Price information may be displayed for paid data.

The displayed data may be visually distinguishable by using different colors, symbols, images, graphics, special effects, and indicators. The controller 160 may automatically download the supplementary information data at a user designated time and store the downloaded supplementary information data in the memory 150 according to an environment setting related to the broadcast mode.

Figure 2:
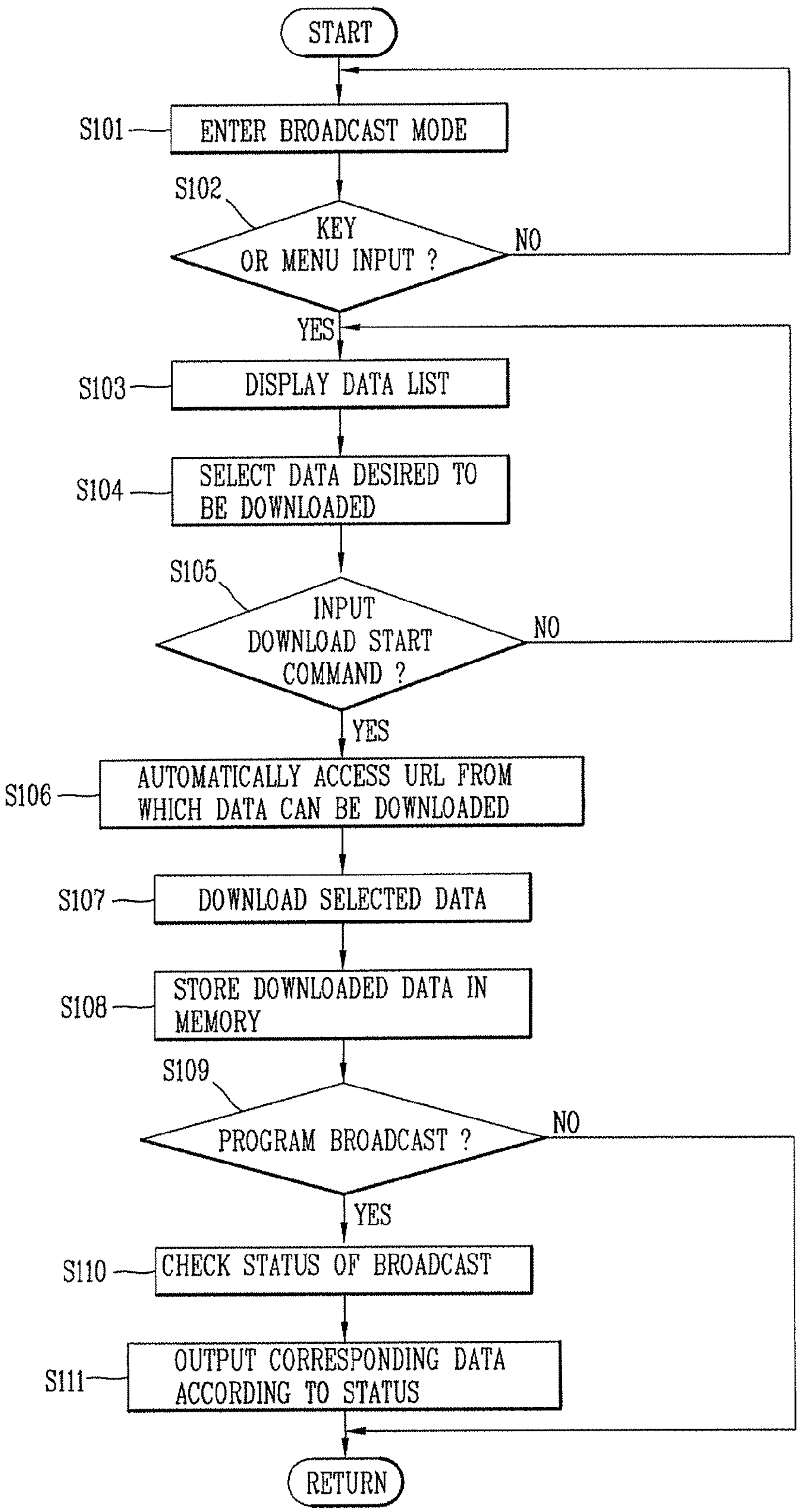
FIG. 2 is a flow chart illustrating a method for synchronizing previously downloaded supplementary information data with a broadcast or a program and outputting the same in real time according to an embodiment of the present invention.

Referring to FIG. 2, the mobile terminal 100 enters a broadcast mode according to a user input selection (S101). The broadcast mode refers to a mode in which the mobile terminal 100 receives and outputs broadcast signals of at least one channel. A channel list indicating a schedule list indicating broadcast programs of each time zone for each broadcast channel, a time table indicating broadcast channels and programs by month, week and day or receivable broadcast channels, such as CNN, BBC, and YTN, may be displayed in a broadcast mode.

The user may input a particular key, select a menu item, activate a certain function, or take a similar action to display the supplementary information data list (S102 and S103) in the broadcast mode. The supplementary information data list shows the types of supplementary information data that can be output upon synchronization with a program of a particular channel when the program is broadcast. The supplementary information data list may be displayed upon user activation or immediately before the broadcast program of the selected channel is output.

In addition, the supplementary information data list may be displayed during broadcasting. The method of displaying the supplementary information data list may be changed through an environment setting selected by the user. For example, the environment setting may be set such that the supplementary information data list is automatically downloaded without displaying the supplementary information data list if there is supplementary information data associated with a broadcast or a program.

One reason for displaying the supplementary information data list is to allow selective downloading of desired supplementary information data by the user. Information related to a paid service/free service, download status, capacity of supplementary information data, and estimated download time may also be displayed in order to facilitate user selection. A user selects the desired supplementary information data for download from the supplementary information data list (S104).

A download start command is then received from the user via a particular key or menu (S105). The controller 160 is then automatically connected with the URL or other source from which the supplementary information data can be downloaded (S106). Downloading of the selected supplementary information data then starts (S107).

The downloaded supplementary information data may be stored in the memory 150 together with its index information (S108). The index information may include a type of the supplementary information data, program information of a channel with which the supplementary information data is to be synchronized, and synchronization time information.

After the supplementary information data associated with the particular broadcast program is downloaded and stored, when a program associated with the supplementary information data is broadcast (S109). The controller 160 checks the progress of the broadcast or status of the program with reference to index information of the supplementary information data (S110) and retrieves the corresponding supplementary information data according to the status (S111).

The synchronization time information is used in one embodiment of the present invention to synchronize the downloaded supplementary information data and the broadcast program in real time. Information regarding the supplementary information data synchronized with a broadcast signal of the broadcast program may be added and transmitted.

Figure 3A:
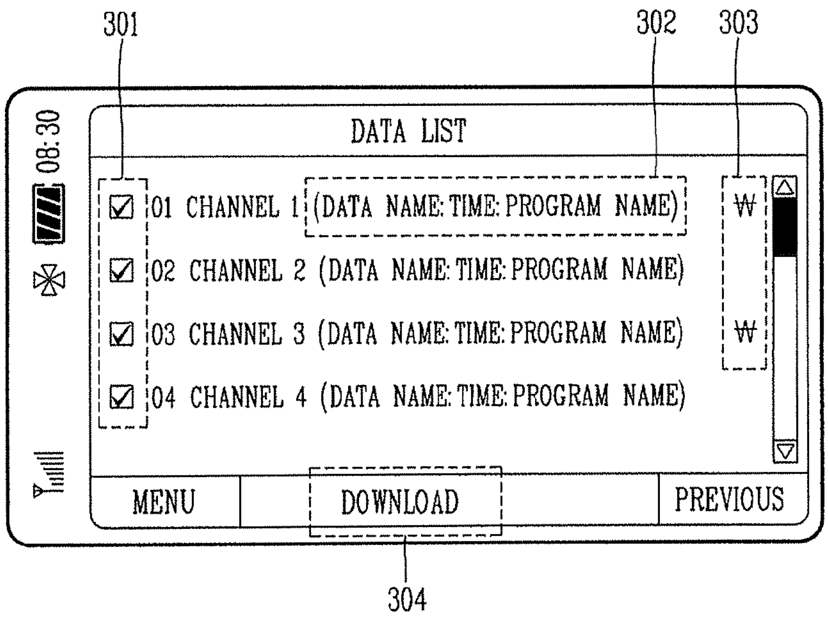
FIGS. 3A and 3B are views of a display of the mobile terminal according to the present invention illustrating screen images of a supplementary information data list.
Figure 3B:
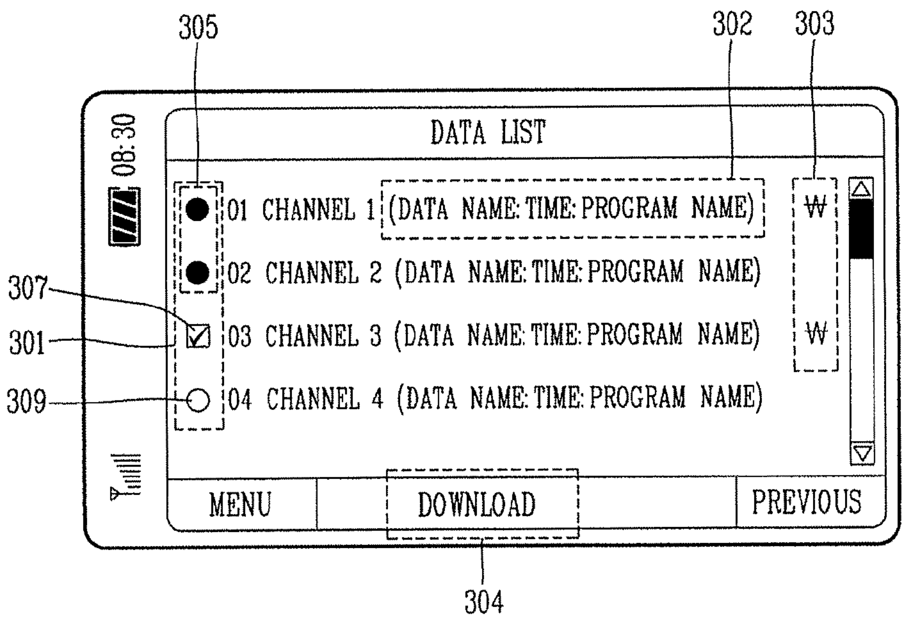

As illustrated in FIGS. 3A and 3B, the supplementary information data list associated with the program broadcast in a particular channel may be displayed upon user input via a particular key or menu selection in the broadcast mode. As illustrated in FIG. 3A, the supplementary information data list includes a select button 301 or other activation function for selectively downloading the supplementary information data desired by the user, information 302 related to a channel, a program associated with each supplementary information data, information regarding the capacity of the supplementary information data and estimated download time, and information about whether each supplementary information data requires payment or is free of charge.

As illustrated in FIG. 3B, the supplementary information data list may further include information about downloading status, such as whether downloading has been completed. For example, a download completion indication 305 may be displayed to indicate that downloading of the supplementary information data is complete.

A select button 305 or a download incomplete indication 309 may be displayed for supplementary information data which has not yet been completely downloaded. The user may re-download the supplementary information data if it has not been completely downloaded.

A download button or menu 304 may be activated after the user selects the desired supplementary information data from the supplementary information data list. The controller 160 is then connected to the URL, from which the selected supplementary information data can be downloaded, and downloading starts.

The supplementary information data may be downloaded through a communication link or path for transmitting a broadcast signal, mobile communication, or transmitting supplementary information data. The downloaded supplementary information data may be stored in the memory 150. The supplementary information may include information related to URL, data synchronized with a broadcast channel or a program, time synchronized with the data, and name of the data.

Price information may be included in the supplementary information data if downloading of the supplementary information data requires payment. A website at which a fee for the supplementary information data is paid may be accessed in order to purchase the data or select a fee rate for data downloading. For example, the data may be downloaded first and the download fee may be included in a communication charge such that the user pays the fee at a later time.

Figure 4A:
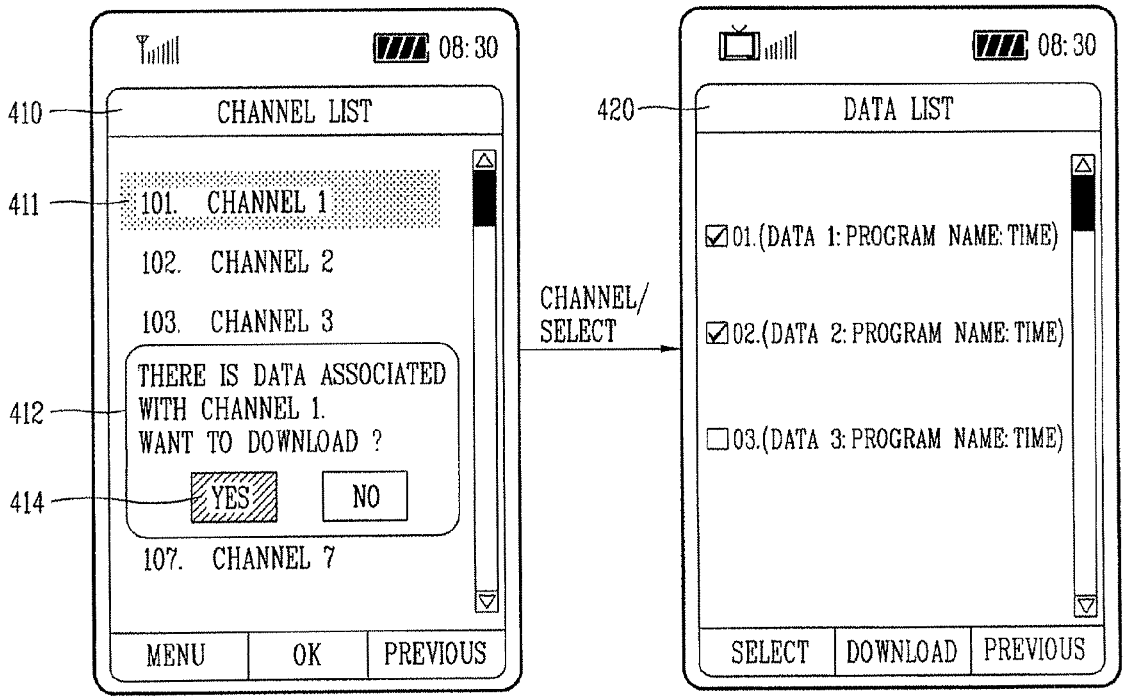
FIGS. 4A to 4D are views of a display of the mobile terminal according to the present invention illustrating screen images of a method for displaying the supplementary information data list.

A method of retrieving and displaying the supplementary information data list will be described with reference to FIGS. 4A to 4D. As illustrated in FIG. 4A, the controller 160 checks whether there is any supplementary information data to be displayed in synchronization with a program to be broadcast through a selected channel when the user selects a desired channel, such as channel 1, from a channel list 410.

A message 412 indicating that there is supplementary information data associated with the selected channel is displayed before or while a broadcast screen image of the selected channel is output if there is supplementary information data to be displayed in synchronization. A select menu 414 inquiring whether to download the supplementary information data is output together with the message 412.

The list of supplementary information data 420 associated with the program to be broadcast through the selected channel may be displayed when the user selects to download the supplementary information data from the select menu 412. The supplementary information data list may include information related to an associated channel, the name of a program related to the data, a download estimated time, the size of the data and the name of data, such as data 1, data 2, and data 3. The selected supplementary information data may be downloaded through the procedure as described with reference to FIGS. 3A and 3B after the supplementary information data for download is selected from the supplementary information data list.

Figure 4B:
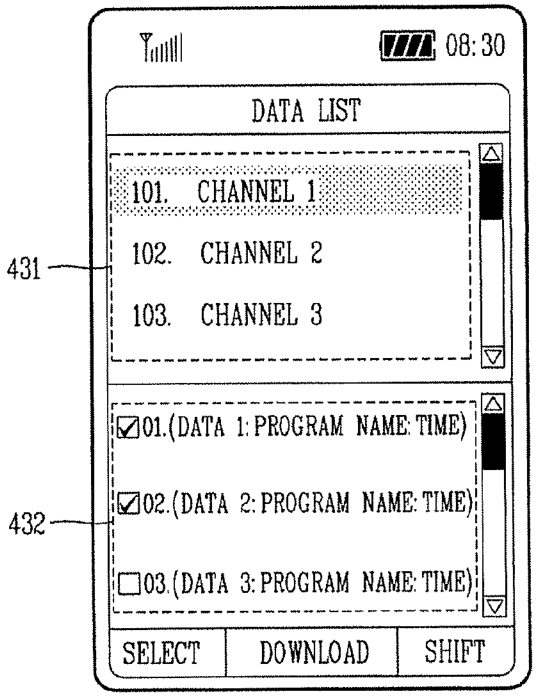

As illustrated in FIG. 4B, the screen may be divided into at least two display areas when the channel list is displayed in order to display the channel information at a first display area 431 and the supplementary information data list associated with the channel selected from the channel information at a second display area 432. As illustrated in FIG. 4B, the channel information is channel 1, channel 2, and channel 3.

Figure 4C:
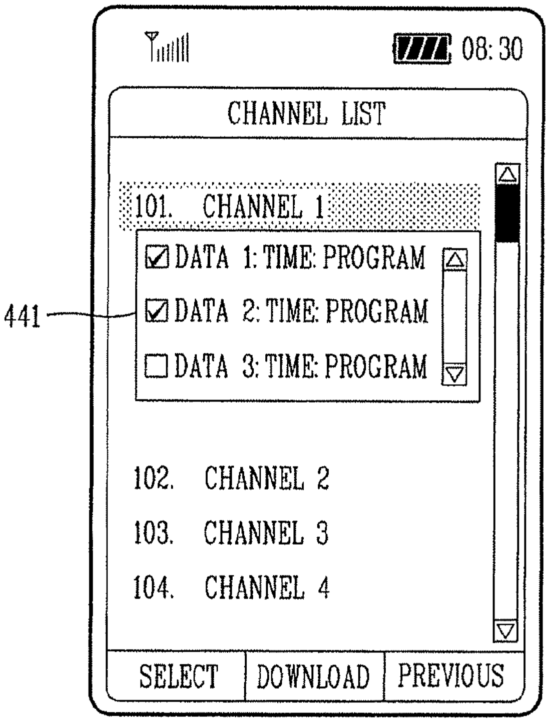

As illustrated in FIG. 4C, a selected channel, such as channel 1, or other channel information, such as channel 2, channel 3, and channel 4, is shifted and the supplementary information data list associated with the selected channel 1 may be displayed. Alternatively, the supplementary information data list associated with the selected channel 1 may be displayed together with the channel information in an overlaid manner without shifting the other channel information, such as channel 2, channel 3, and channel 4.

A particular program is selected from the schedule list in order to output the supplementary information data list associated with the selected program if the schedule list is displayed instead of the channel list. The method for configuring the supplementary information data list and downloading the supplementary information data selected from the supplementary information data list may be performed as described with reference to FIGS. 3A and 3B. The supplementary information data list may be retrieved and displayed while broadcast screen images are being output.

Figure 4D:
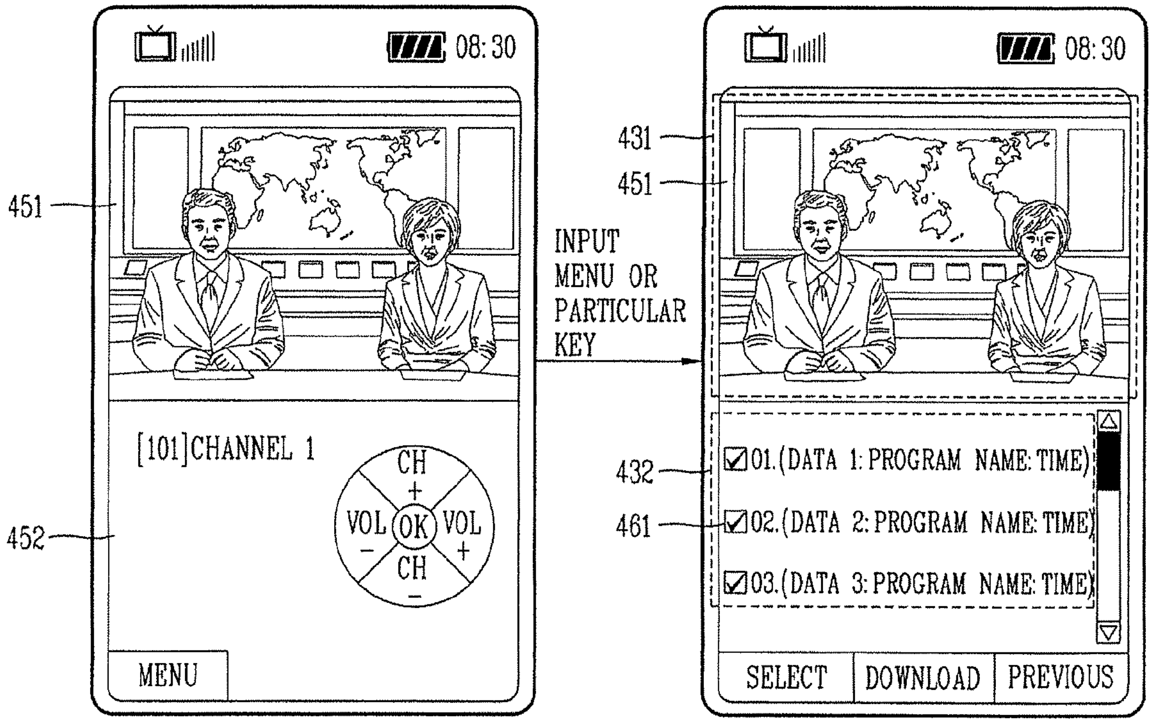

As illustrated in FIG. 4D, the broadcast screen image 451 is output on one 431 of the two divided display regions and the supplementary information data list associated with the program on the broadcast channel 461 may be displayed at the other 432 display region while a broadcast screen image of the selected channel is output if the user retrieves the supplementary information data list by selecting a particular key or menu.

The second display area 432 may be used to display information related to the broadcast channel or control button for changing channels or volume 452 if the second display area is not used to display the supplementary information data list.

Downloading of the data may start upon selection of a download button or menu by the user after the user selects the desired data from the supplementary information data list. The downloading of the data may start immediately or at a reserved time according to environment settings selected by the user.

Figure 5:
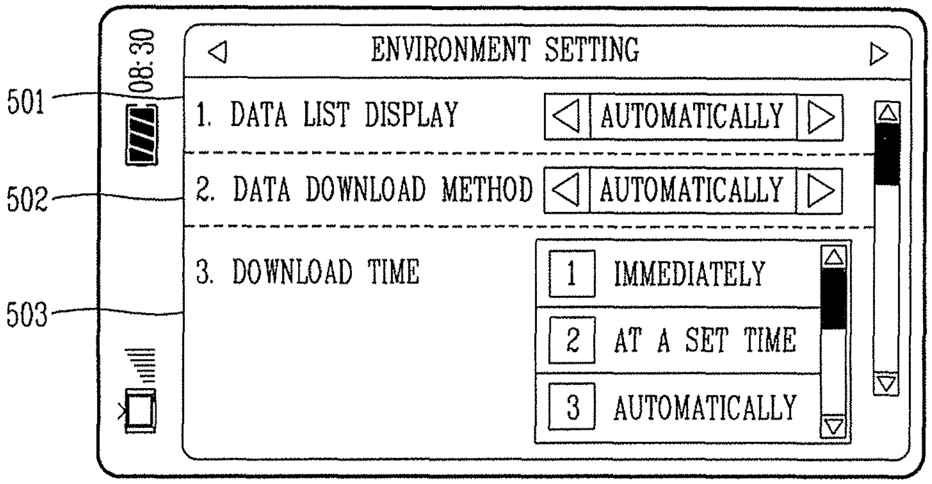
FIG. 5 is a view of a display of the mobile terminal according to the present invention illustrating a screen image for setting an environment for downloading supplementary information data.

As illustrated in FIG. 5, an environment selection menu may include a 'data list display' item 501. The 'data list display' item allows selection of whether to automatically display a supplementary information list or display the supplementary information upon a user's request via a particular key or other activation means when supplementary information associated with a selected channel or program is available.

The environment setting menu may also include a 'data download method' item 502. The 'data download method' item 502 allows selection of whether to automatically download all data associated with the selected channel or program in the absence of user input or to download only the data selected according to an input via a particular key or other user selection when the supplementary information data associated with the selected channel or program is available.

The environment setting menu may also include a 'download time' item 503. The 'download time' item 503 allows selection of time at which downloading should start such that the supplementary information data associated with the selected channel or program may be received at a desired time.

The 'download time' item 503 may allow selection of 'immediately when a key is input,' a time period during which a communication fee is discounted, such as when air-time usage costs less, a time period during which call communication is minimal, a time period during which data communication is minimal, and a time specifically set by the user. The controller 160 may automatically download the selected data at a user designated time and store the downloaded data in the memory 150 according to the particular environment selection.

Figure 6A:
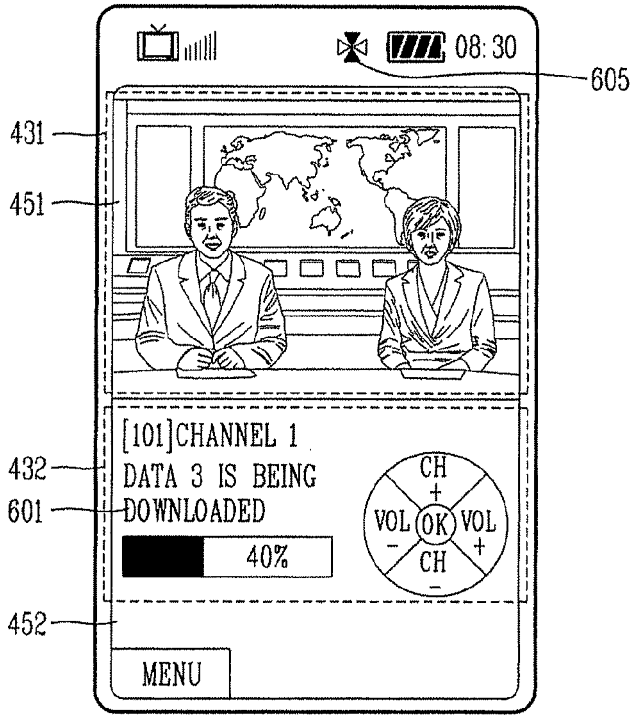
FIGS. 6A and 6B are views of a display of the mobile terminal according to the present invention illustrating screen images for downloading supplementary information data while a broadcast image is being output.

As illustrated in FIG. 6A, the controller 160 downloads the supplementary information while outputting the broadcast screen image or video 451 if supplementary information associated with the broadcast program is desired to be downloaded. The screen may be divided into two or more display areas, and a first of the display areas 431 may output the broadcast screen image 451 and a second display area 432 may display information related to the downloading process 601.

The downloading progress information 601 may be displayed in the form of a graphical bar indicator or other similar visual means. A download indicator 605 or other type of graphic indicator may be displayed on a region of the display to indicate the download status.

Figure 6B:
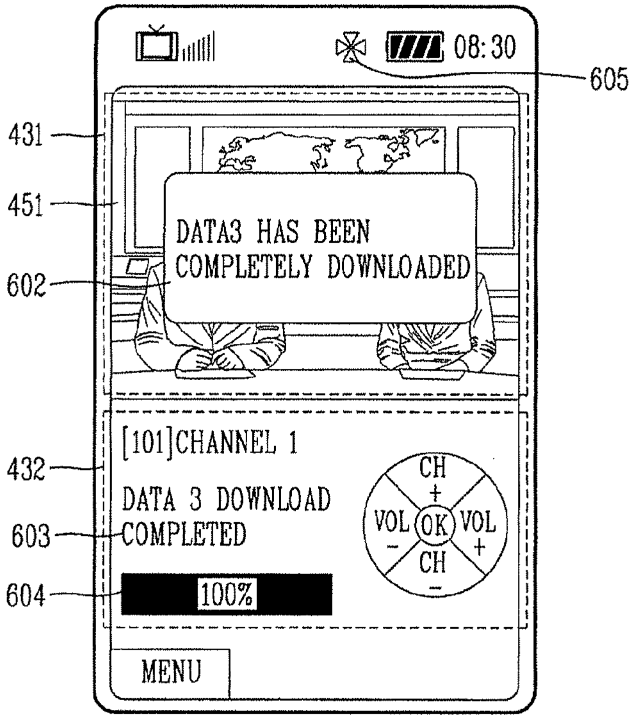

As illustrated in FIG. 6B, a message 602 or other indicator informing the completion of the downloading may be output on the first display area 431 on which the broadcast screen image 451 is output if downloading of the supplementary information is completed while the broadcast screen image is being output. Other forms of indications, such as audible and tactile notification, may be provided to the user. For example, the message 602 may be shown in an overlapping display manner.

Alternatively, information 603 and 604 indicating completion of the downloading may be displayed on the second display area 432. The information 603 and 604 may be displayed in a format such as text, symbols, videos, images, animation, and graphics.

The download indicator 605 may also indicate the completion of the downloading by being displayed in a different manner during the downloading. For example, the download indicator 605 for indicating the download progress status and the download indicator for indicating download completion may have the same shape but different colors or display effects.

The downloaded supplementary information data is stored in the memory 150. The supplementary information data is synchronized in real time and output together with the broadcast program.

The index information of the supplementary information data may be used in order to synchronize the supplementary information data stored in the memory with the program broadcast in real time. The index information may include program information of the channel to be synchronized, synchronization time information and information related to the name and format of the synchronized supplementary information data. Other types of information may additionally or alternatively be used.

Figure 7:
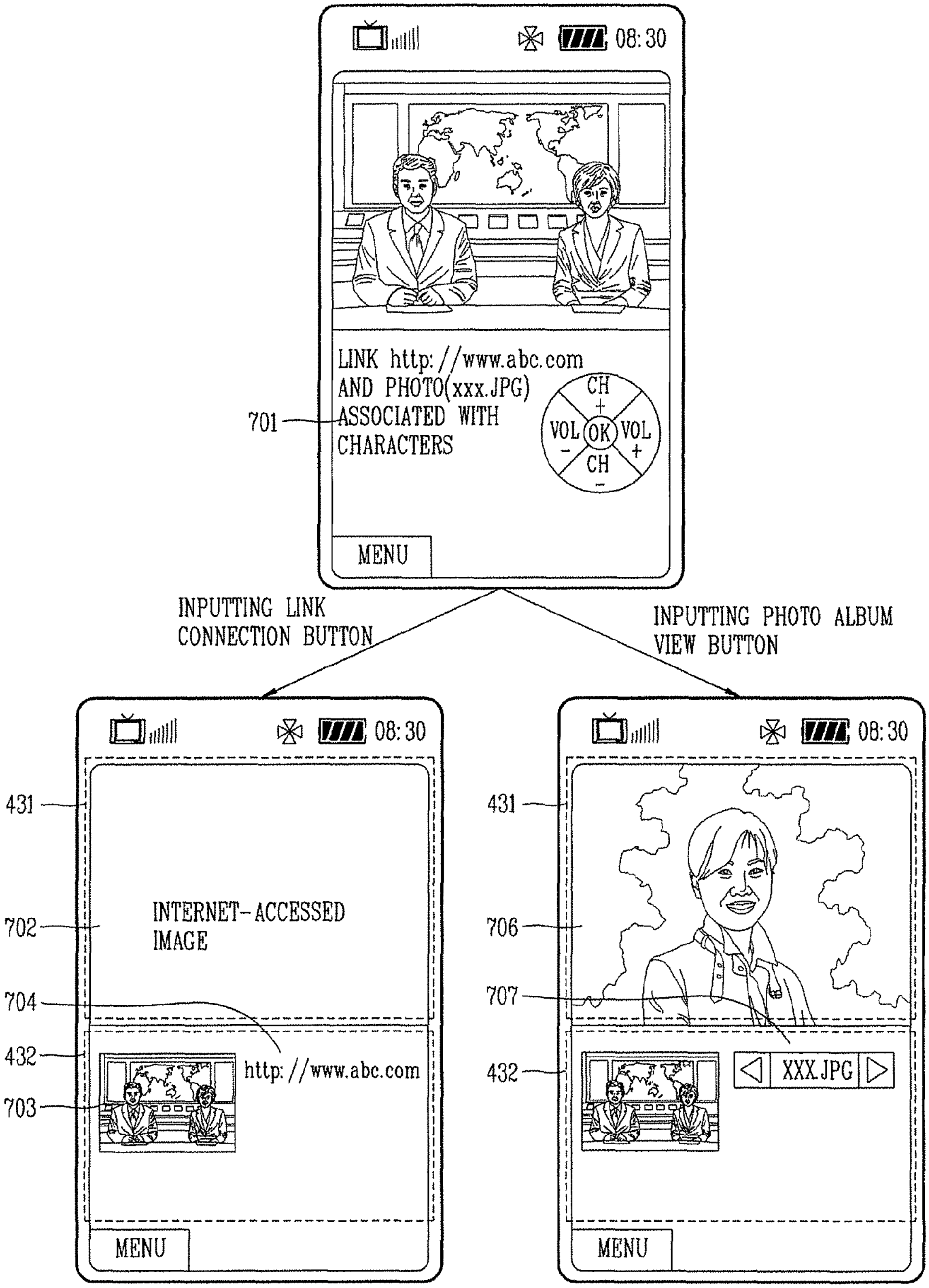
FIG. 7 is a view of a display of the mobile terminal according to the present invention illustrating screen images for synchronizing downloaded supplementary information data with a broadcast or program and outputting both the supplementary information data and broadcast simultaneously.

As illustrated in FIG. 7, the corresponding supplementary information data is retrieved from the memory 150 and output according to the broadcast status of the program 701. A corresponding reproduction program or a document viewer program may be accessed at the same time to display the supplementary information data in an appropriate format, such as multimedia data, or document data.

As illustrated in FIG. 7, the user may access the supplementary information data by activating a designated key, menu item, or other function when URL information, such as WWW.ABC.COM, and photo information, such as 'xxx.JPG,' associated with the program being broadcast exist 701. The URL is accessed to output an Internet access screen image 702 at a first area of the display region 431 and the accessed URL information 704 is displayed at a second area of the display region 432 when a key for outputting the linked URL information is input or other means of activation is performed.

The broadcast screen image 703 may be shifted to another area of the display region. The size of the broadcast screen image 703 may also be changed or reduced. Furthermore, various types of image output schemes may be employed.

Alternatively, a photo image 706 is output at a first area of the display region 431 and the file name 707 of the photo is displayed on a second area of the display region 432 if a key for outputting a photo image associated with the program is input or such function is activated. The position of the display areas of the photo and the broadcast screen image may be interchanged.

The present invention also provides a user interface for a multimedia playback device. The user interface may include a first screen area displaying real-time broadcast data and a second screen area displaying supplementary data related to the real-time broadcast data.

The supplementary data may have been previously downloaded and is displayed in a synchronized manner with the real-time broadcast data in order to allow user interaction via graphical icons shown on the second screen area. The graphical icons may include a status icon and one or more selectable icons. Selectable icons are activated by user inputs on a touch screen or manipulation of other input means. The second screen area may be any area on the screen other than the first screen area.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A mobile terminal, comprising:

a communication unit configured for accessing a network entity and for transmitting and receiving signals for a call communication;

a memory configured for storing information;

an output unit configured for outputting information; and a controller configured for:

displaying a list of channels available for broadcasting via the output unit;

displaying notification data via the output unit in response to first user input, the notification data indicating an availability of a list of supplementary information data associated with a channel when the list of supplementary information data is available, wherein the first user input selects the channel from the list of channels;

displaying the list of supplementary information data via the output unit in response to second user input for displaying the list of supplementary information data, wherein the second user input is received in response to the displayed notification data and the displayed list of supplementary information data comprises:

identifiers for a plurality of supplementary information data;

corresponding program names for a plurality of broadcast programs associated with the plurality of supplementary information data; and selection means for selecting at least one of the plurality of supplementary information data;

selecting, from the list of supplementary information data, at least two supplementary information data associated with at least two broadcast programs among a plurality of broadcast programs on the selected channel to be downloaded to the memory when selection means corresponding to the at least two supplementary information data are selected from the displayed list of supplementary information data;

downloading and storing in the memory the at least two supplementary information data in response to third user input, prior to receiving any of the at least two broadcast programs via the selected channel;

synchronizing each one of the at least two supplementary information data with a corresponding one of the at least two broadcast programs when the corresponding one of the at least two broadcast programs is broadcasted; and outputting each of the at least two supplementary information data and the corresponding one of the at least two broadcast programs in synchronization via the output unit.

2. The mobile terminal of claim 1, further comprising:

an input unit configured for receiving setting information indicating when the at least two supplementary information data are received, wherein the memory is further configured for storing the setting information, and wherein each one of the at least two supplementary information data are received at a specific time when the specific time is designated in the setting information.

3. The mobile terminal of claim 1, wherein the controller is further configured for synchronizing each of the at least two supplementary information data with the corresponding one of the at least two broadcast programs by using index information.

4. The mobile terminal of claim 3, wherein the index information comprises at least channel information, program information, synchronization time information, names associated with the at least two supplementary information data, capacities associated with the at least two supplementary information data, formats associated with the at least two supplementary information data, or URL (Uniform Resource Locator) information from which the at least two supplementary information data are downloaded.

5. A method for a mobile terminal outputting broadcast data and supplementary information data in synchronization, the method comprising:

displaying a list of channels available for broadcasting on a display of the mobile terminal;

displaying notification data indicating an availability of a list of supplementary information data associated with a channel when the list of supplementary information data is available in a network entity that can communicate with the mobile terminal in response to first user input selecting the channel from the list of channels;

displaying the list of supplementary information data associated with the channel on the display in response to second user input for displaying the list of supplementary information data, wherein the second user input is received in response to the displayed notification data and the list of supplementary information data comprises:

identifiers for a plurality of supplementary information data;

corresponding program names for a plurality of broadcast programs associated with the plurality of supplementary information data; and selection means for selecting at least one of the plurality of supplementary information data;

selecting, from the list of supplementary information data, at least two supplementary information data associated with at least two broadcast programs among a plurality of broadcast programs on the selected channel to be downloaded to a memory of the mobile terminal when selection means corresponding to the at least two supplementary information data are selected from the displayed list of supplementary information data;

downloading and storing in the memory the at least two supplementary information data in response to third user input, prior to receiving any of the at least two broadcast programs via the selected channel;

synchronizing each one of the at least two supplementary information data with a corresponding one of the at least two broadcast programs when the corresponding one of the at least two broadcast programs is broadcasted; and displaying each of the at least two supplementary information data and the corresponding one of the at least two broadcast programs in synchronization on the display.

6. The method of claim 5, wherein synchronizing the at least two supplementary information data with the corresponding one of the at least two broadcast programs is performed using index information.

7. The method of claim 6, wherein the index information comprises at least channel information, program information, synchronization time information, names associated with the at least two supplementary information data, capacities associated with the at least two supplementary information data, formats associated with the at least two supplementary information data, or URL (Uniform Resource Locator) information from which the at least two supplementary information data are downloaded.

8. The method of claim 5, wherein displaying each one of the at least two supplementary information data and the corresponding one of the at least two broadcast programs comprises:

dividing a display screen of the display into at least two display regions; and displaying the corresponding one of the at least two broadcast programs on a first display region of the display screen and displaying each one of the at least two supplementary information data on a second display region of the display screen.

9. The method of claim 5, wherein downloading and storing the at least two supplementary information data comprises displaying a download progress status or download completion information of the at least two supplementary information data.

10. The method of claim 9, wherein the download progress status or download completion information is displayed as at least text, a symbol, a video, an image, an animation or a graphic.

11. The method of claim 10, further comprising:

displaying an indicator that has a different color or a different display effect than the download progress status or download completion information in order to indicate a status of the downloading.

* * * * *